US 6,655,921 B2

(12) United States Patent
Kocian

(10) Patent No.: US 6,655,921 B2
(45) Date of Patent: Dec. 2, 2003

(54) ROTOR BLADE

(75) Inventor: Frank Kocian, Muenster (DE)

(73) Assignee: Deutsches Zentrum fuer Luft- und Raumfahrt e.V., Cologne (DE)

( * ) Notice: Subject to any disclaimer, the term of this patent is extended or adjusted under 35 U.S.C. 154(b) by 65 days.

(21) Appl. No.: 10/024,074

(22) Filed: Dec. 17, 2001

(65) Prior Publication Data

US 2002/0076328 A1 Jun. 20, 2002

(30) Foreign Application Priority Data

Dec. 18, 2000 (DE) .......................... 100 65 192
Mar. 2, 2001 (DE) .......................... 101 10 102

(51) Int. Cl.$^7$ ............................................. F04D 29/38
(52) U.S. Cl. .................................. 416/224; 416/229 R
(58) Field of Search .......................... 416/224, 229 R, 416/230

(56) References Cited

U.S. PATENT DOCUMENTS 6,471,485 B1 * 10/2002 Rossmann et al. .......... 416/230

FOREIGN PATENT DOCUMENTS

| FR | 2.165.264 | 8/1973 |
| GB | 131 82 60 | 5/1973 |
| WO | WO 99/27234 | 6/1999 |

* cited by examiner

Primary Examiner—Edward K. Look
Assistant Examiner—Kimya N McCoy
(74) Attorney, Agent, or Firm—Barry R. Lipsitz; Douglas M. McAllister

(57) ABSTRACT

In order to create a rotor blade of hybrid design comprising a vane and a blade root, the vane having a first vane portion made of a metallic material and a second vane portion made of a lightweight material, provision is made for a rear edge of the rotor blade to be formed on the second vane portion, and for the second vane portion to be joined to the first vane portion in a single-section-type manner.

41 Claims, 3 Drawing Sheets

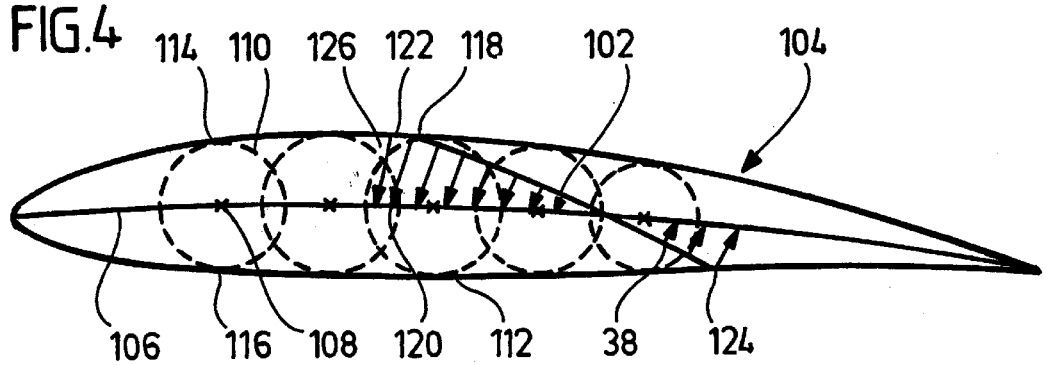
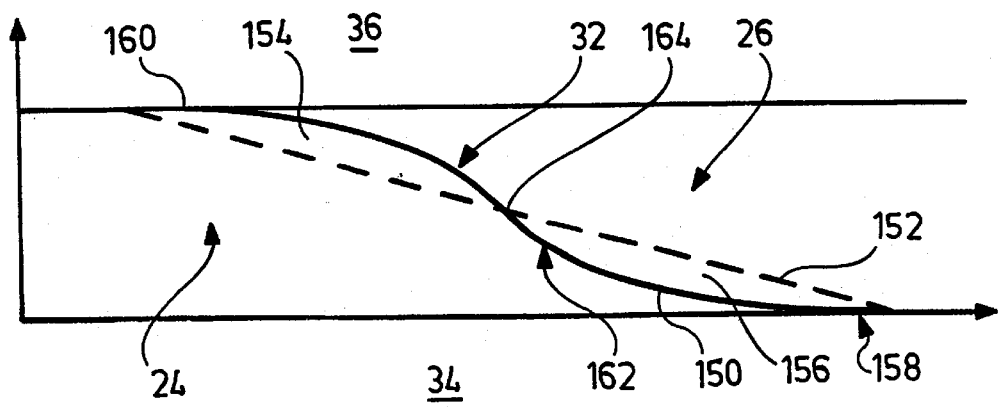
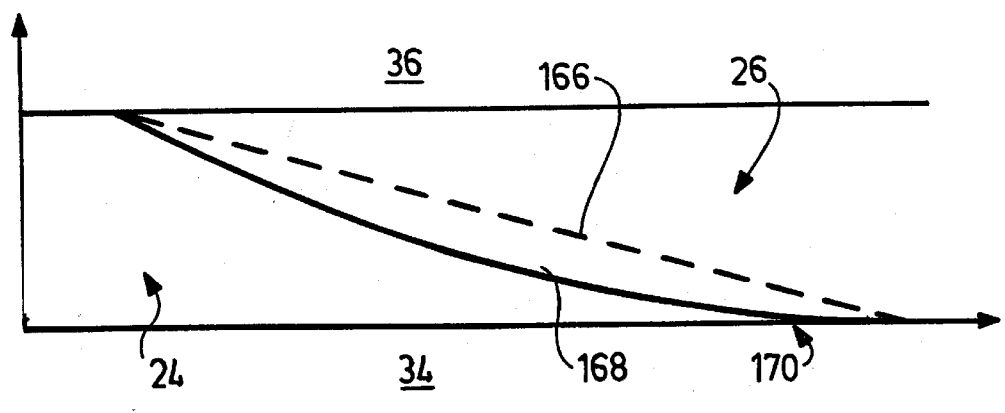

ROTOR BLADE

The present disclosure relates to the subject matter disclosed in German applications No. 100 65 192.5 of Dec. 18, 2000 and No. 101 10 102.3 of Mar. 2, 2001, which are incorporated herein by reference in their entirety and for all purposes.

BACKGROUND OF THE INVENTION

The invention relates to a rotor blade of hybrid design comprising a vane and a blade root, the vane comprising a first vane portion made of a metallic material and a second vane portion made of a lightweight material.

Such a rotor blade is described in DE 197 51 129 C1. Herein the vane is held in a slot formed on a metallic vane portion.

A rotor blade is known from EP 0 764 763 A1, wherein a second segment made of a composite material is placed in a first segment made of a metallic material.

In the article "Ein starker Verdichter" ("A strong compressor") in the DLR-Nachrichten (DLR News) of June 2000, pages 54–57, a hybrid blade comprising a part made from a carbon fiber composite material is described.

Further rotor blades of hybrid design are known, for example, from DE 1 628 355, GB 2 264 755 A, U.S. Pat. No. 3 883 267, DE 195 35 713 A1, DE 26 31 856 C2 or DE 2 042 665.

Starting therefrom, the object underlying the invention is to create a rotor blade of hybrid design having, on the one hand, a low mass, and, on the other hand, a high bearing capacity with respect to loads.

SUMMARY OF THE INVENTION

This object is accomplished with the rotor blade mentioned at the outset, in accordance with the invention, in that a rear edge of the rotor blade is formed on the second vane portion, and in that the second vane portion is joined to the first vane portion in a single-section-type manner.

With the hybrid construction, various materials with different physical properties are combined with one another to achieve an optimum design for a rotor blade. A rear edge of the rotor blade has essentially only an aerodynamic function and can, therefore, be formed on the second vane portion made of the lightweight material. The weight of the rotor blade according to the invention can be minimized by such a "light" rear edge.

When joining two parts made of different materials, mechanical stresses are caused, in principle, in transition areas, on the one hand, by the manufacture, and, on the other hand, by loads during use, which are due to different material behavior and to different physical and chemical material properties, such as, for example, thermal expansion, shrinkage processes during polymerization and curing (hardening) and different rigidities and different transverse contraction behavior. Hydrostatic stresses between the first vane portion and the second vane portion are strongly reduced by the second vane portion being joined to the first vane portion in a single-section-type manner. Such stresses occur when one part is at least partially enclosed and/or embraced by a second part, and three-dimensional constraints are caused thereby. These occur, in particular, when two parts embrace one another in a clamp-like fashion. Owing to the single-section-type joint according to the invention, deviatoric stresses preferably occur during the manufacture, and, in contrast to hydrostatic stresses, these can already be relaxed by flow processes in the course of manufacture of the single-section-type joint, with the second vane portion joined to the first vane portion in a tapered manner with a gradual increase in the width of one portion and a corresponding gradual decrease in the width of the other portion. Fewer material problems thus occur with the rotor blade according to the invention, as an homogeneous transition is achieved between the first vane portion and the second vane portion. At the same time, however, mass can be saved, which, in turn, results in a reduction of the load on the blade root.

The combination of a light rear edge with a single-section-type joint thus results in the mass of the rotor blade being reduced and in material problems, such as occur with the hybrid design, being at least diminished.

During operation, a rotor blade may be subjected to high temperatures, which results in a corresponding thermal expansion of the material of the rotor blade. With three-dimensional constraints, this can lead to the occurrence of stresses which limit the stability of the rotor blade under load. The danger of breakage caused by thermal stresses is strongly reduced by the single-section-type joint according to the invention, with which three-dimensional constraints are essentially avoided, because these stresses are easier to reduce or do not occur or not to the same extent as when three-dimensional constraints prevail.

In accordance with the invention, a rotor blade with a high bearing capacity with respect to dynamic and quasistatic loads and also with respect to impact loads such as bird strikes and with a relatively low mass can then be created.

It is of advantage for the second vane portion to be joined to the first vane portion in a tapered manner with a gradual increase in the width of one portion and a corresponding gradual decrease in the width of the other portion, so as to avoid material problems in the transition area between the first vane portion and the second vane portion.

It is of particular advantage for a front edge of the rotor blade to be formed on the first vane portion ("heavy front edge"). A stagnation point of the air stream flowing around the rotor blade lies at the front edge. The latter is, therefore, under heavy load, and the metallic material of the first vane portion ensures good protection against erosion. Moreover, the danger of bird impact is also considerably higher in the area of the front edge of the rotor blade. The metallic material of the first vane portion can absorb the energy of the bird impact irreversibly by plastic deformation without loss of the vane itself. This means that the operation of an engine equipped with rotor blades according to the invention is still possible in spite of bird impact.

The first vane portion advantageously protrudes in a front portion thereof beyond the second vane portion. An increased resistance to erosion with respect to the front edge is thereby achieved, and, on the other hand, the total mass of the vane can be minimized. To this end, a front edge of the rotor blade is expediently formed in the front portion.

It is also particularly expedient for the second vane portion to protrude in a rear portion thereof beyond the first vane portion. In this way, the rear edge can be formed on the second vane portion, and the mass of the vane can thereby be further reduced and the load on the blade root thus decreased. The rear portion is designed so that it has essentially only an aerodynamic function, and its force load, in particular, with respect to centrifugal forces, buoyancy forces, erosion and impact such as by bird strikes is low or has only a slight probability of occurrence. In particular, the rear edge of the rotor blade is formed in the rear portion.

In order to form a single-section-type joint surface between the vane portions, with the vane portions joined together in a tapered manner with a gradual increase in the width of one portion and a corresponding gradual decrease in the width of the other portion, it is particularly expedient for the second vane portion to be arranged on the first vane portion. In addition, the rotor blade according to the invention can thereby be manufactured in a simple way, as the first vane portion can be manufactured separately from the second vane portion.

It is of advantage for the first vane portion to form a concave side of the rotor blade at a front edge of the rotor blade. Furthermore, it is expedient for the first vane portion to form a convex side of the rotor blade at a front edge of the rotor blade. The front edge is thus made of the metallic material and, in particular, a good resistance to erosion and impact is thus achieved.

It is also expedient for the second vane portion to form a concave side of the rotor blade at a rear edge of the rotor blade. In addition, the second vane portion forms a convex side of the rotor blade at a rear edge of the rotor blade. The total mass of the rotor blade is thereby reducible.

It is of particular advantage for the second vane portion to form an area of the rotor blade which has essentially only aerodynamic functions. The material of the second vane portion has, on the one hand, a lower density than the material of the first vane portion so as to reduce the mass of the rotor blade. On the other hand, however, it may under certain circumstances have a worse plastic behavior and is then more susceptible to brittle fractures, in particular, when it is a ceramic material. The force load should, therefore, be low in this area. It is possible to determine on a rotor blade areas which have a low force load and areas which have a high force load. Such a last-mentioned area is, in particular, the blade root area. If the areas with essentially only aerodynamic functions are made from the material of the second vane portion, an overall optimization of the rotor blade is then achieved.

It is expedient for the second vane portion and the first vane portion to be joined together in a joint surface formed at an area of the first vane portion and at an area of the second vane portion. A gradual transition (graduation) is thereby achieved between the materials, and hydrostatic stresses are thus avoided in a simple way, and, depending on the material, deviatoric stresses are already reducible during the manufacture by the possibility of plastic flow, and, as a result of this, the danger of material flow during operation is avoided or at least reduced.

In order to achieve a single-section joint between the two vane portions, with the vane portions joined together in a tapered manner with a gradual increase in the width of one portion and a corresponding gradual decrease in the width of the other portion, the joint surface should be designed such that a curvature radius is substantially larger than the lateral extent of the joint surface, and, in particular, at least five times, and, advantageously, at least ten times larger than this lateral extent. In the case of a flat joint surface, the curvature radius is infinite.

An alternative or additional criterion for design of a joint surface in a tapered manner with a gradual increase in the width of one vane portion and a corresponding gradual decrease in the width of the other vane portion, is that the deviation of normal vectors of the joint surface from an average normal vector of the joint surface be at the most 20° and, in particular, be less than 10°. It is thereby ensured that the joint surface is not of double-section design. This serves to avoid hydrostatic stresses in the joint surface.

A particularly suitable criterion for the presence of a single-section-type joint, with the vane portions joined together in a tapered manner with a gradual increase in the width of one portion and a corresponding gradual decrease in the width of the other portion, is when a curve formed by the section of the joint surface with a profile section is in one-to-one correspondence with the median line of the profile section. A median line of a profile is defined as the connecting curve of the central points of the circles inscribed in the profile and touching the latter at two points. The median line of the profile section is then the central point curve of the circles inscribed in the two-dimensional profile section. If the relation of the intersection curve of the joint surface with the profile section relative to the median line of the profile section along its arc length is in one-to-one correspondence, this correlation can then be represented by a stringently monotonic function. For example, a corresponding functional value along the arc line is obtained by the location of the intersection curve, normalized to the local width at the median line, being drawn on the normal to the median line within a profile section. Only if the resulting course of the function is in one-to-one correspondence (stringently monotonic), is there a single-section-type joint, with the vane portions joined together in a tapered manner with a gradual increase in the width of one portion and a corresponding gradual decrease in the width of the other portion.

It is of advantage for the blade root to be joined to the first vane portion. The force load of the rotor blade at the blade root is at its highest, as, in particular, the centrifugal forces and possible force loads owing to impact are highest there. Owing to the blade root being joined to the first vane portion, and, in particular, being integrally formed thereon, it is ensured that the ductile isotropic metal can absorb the forces without the occurrence of brittle cracks which, in turn, can result in brittle fracture.

It is of advantage for the second vane portion to be arranged outside an adjoining area of the blade root. Increased force load also prevails around an adjoining area of the blade root. The second vane portion with the brittle material and the light rear edge in comparison with the heavier front edge is then sufficiently far removed from regions of increased force load.

It is expedient for the rotor blade to comprise a first area between a convex side and a concave side of the rotor blade, with the first area being made of the metallic material, a second area between the convex side and the concave side of the rotor blade, with the second area being made of the lightweight material, and a transition area between the convex side and the concave side of the rotor blade, with the transition area partially including the metallic material and partially including the lightweight material. There is an homogeneous transition (graduation) between the materials in this transition area, and, therefore, material problems are reduced there. In particular, it is advantageous for a gradual transition of the materials with respect to the distance between convex side and concave side of the rotor blade to occur in the transition area, in order, on the one hand, to reduce the material problems in the transition area and, on the other hand, to improve the joint and avoid hydrostatic stresses.

It is expedient for the transition area to be approximately linear in a cross-sectional area of the rotor blade. The linear transition is only to be understood as first approximation. With such a linear transition, it is guaranteed that the joint surface will be of single-section-type, with the second vane portion being joined to the first vane portion in a tapered manner with a gradual increase in the width of one vane portion and a corresponding gradual decrease in the width of the other vane portion, and hydrostatic stresses are then substantially avoided.

It may, however, be provided that the transition area deviates from the linearity in that the second vane portion is enlarged towards the concave side of the rotor blade in the transition area. The second vane portion then preferably expands at the end of the transition area facing the rear edge to a greater extent than linearly, i.e., it bulges outwardly into the first vane portion. The compatability of the different materials of the two vane portions is thereby increased: With a metallic material as used in the first vane portion, the shear deformability is, as a rule, negligible, whereas the material of the second vane portion is soft with respect to a transverse deformability. Owing to the bulge extending into the metal, it is ensured that the latter will taper off thinly, whereby the different deformation patterns of the materials are adapted to each other by the geometrical configuration of the transition area. It is preferable for the first vane portion to taper off in a thin foil.

It may also be provided that the first vane portion is enlarged towards the convex side in the transition area, i.e., the metallic material has a bulge extending in the direction towards the convex side of the rotor blade into the second vane portion. In particular, the bulge of the metallic material lies in that area of the transition area which is closer to the front edge. Stress peaks are thereby avoidable in this area, as the geometrical configuration of the joint surface ensures a "flatter" tapering-off. The susceptibility to start cracking is thereby reduced in this area.

In a variant of an embodiment, it is provided that in the transition area closer to the front edge the first vane portion is enlarged with respect to a linear course, and in the area of the transition area closer to the rear edge, the second vane portion is enlarged with respect to a linear course. The metallic material then extends in a bulge in the transition area facing the convex side, and the lightweight material extends in a bulge in the transition area facing the concave side of the rotor blade. In this variant of an embodiment, an intersection curve between the joint surface and a profile section then has a turning point with respect to a straight line. In this variant, the transition area is geometrically configured such that in the area lying closer to the front edge, the susceptibility to start cracking is reduced, and in the area lying closer to the rear edge an improved compatability of the different materials with respect to shear deformations is achieved.

To optimize a rotor blade according to the invention with respect to stability under load, on the one hand, and mass, on the other hand, it is expedient for the first vane portion to laterally occupy approximately 20% to 45% of the convex side of the rotor blade at least in an area remote from the blade root. It is further expedient for the first vane portion to laterally occupy 50% to 75% of a concave side of the rotor blade at least in an area remote from the blade root. In particular, the first vane portion should occupy approximately ⅓ of the convex side and approximately ⅔ of the concave side. This results in an optimum transition area, by means of which, on the one hand, a good joint (adhesion) is achievable between the two vane portions, and, on the other hand, a good reduction in mass is obtainable.

Titanium or a titanium compound has proven particularly advantageous as material for the first vane portion. A reinforcement of the basic metal material with silicon carbide fibers can also be provided. These materials are then referred to as titanium matrix composite (TMC). These have excellent strength and rigidity values.

It is of advantage for the material for the second vane portion to be a fiber composite. Such materials have a low density, i.e., are very light. With a rotor blade designed in accordance with the invention, the average load on the blade root can be reduced by, for example, 20%.

A particularly light fiber composite suitable as material for the second vane portion is a carbon fiber composite (CFK).

To enable secure holding of the second vane portion on the first vane portion, these are adhesively bonded to each other. In principle, it is conceivable to provide an adhesive material for this purpose. It can, however, also be provided that the bonding is achievable without a separate adhesive material by the application of a fiber layup or prepreg material to a correspondingly pretreated metal. If, in particular, the second vane portion is formed by a fiber layup or prepreg material which is placed on the first vane portion and then further processed, a good and homogeneous joint is thereby achieved. In the case of a fiber layup the further processing is in the form of resin impregnation within a mold. In the case of a prepreg material the further processing is effected by consolidation and, in particular, pressing.

In order to achieve a good bonding, it is advantageous for the first vane portion to have a roughened surface in an overlapping area. An adhesive-matrix unit can thereby be formed at the joint surface, by means of which the second vane portion is adhesively joined to the first vane portion without an additional adhesive material having to be provided.

To achieve a secure bond between the two vane portions, it can be provided that the joint is reinforced by sewing or riveting in addition to the adhesion.

The invention further relates to a process for the manufacture of a rotor blade as described above.

The object underlying the invention is to provide a process which allows manufacture of a rotor blade which is optimized with respect to loading and mass.

This object is accomplished with the aforesaid process in accordance with the invention in that the first vane portion is manufactured, in that a surface area of the first vane portion is machined in preparation for the application of a lightweight material for formation of the second vane portion, and in that the lightweight material is then applied and a second vane portion formed.

One thus proceeds from a preformed first vane portion and then forms the second vane portion thereon. Thus, for example, the first vane portion can be used as part of a mold, and, in addition, a good joining of the joint is ensured.

In order to obtain a high-quality joining of the joint it is advantageous for the surface area to be cleaned. In particular, the latter is made grease-free by using, for example, solvents.

It is also advantageous for the surface area to be roughened. A good bonding between composite with its matrix structure and the metal surface is thereby achieved. It can, for example, be provided that the surface area is sandblasted for mechanical roughening. It can also be provided that the surface area is machined ultrasonically.

In a variant of an embodiment wherein, in particular, a thermosetting material is used as lightweight material, a fiber material is placed in a mold and infiltrated with resin which then cures. Alternatively, a prepreg lightweight material comprising preimpregnated fabric layers with fibers in a matrix can be used.

It is then expedient for a layup to be placed on the surface area and then further processed, in order to manufacture the second vane portion, on the one hand, and, at the same time, to bring about the joining with the first vane portion, on the other hand. The layup can be a fiber layup in which the matrix structure is produced by subsequent resin impregnation. It may also be a prepreg material which already comprises a matrix structure. If the fiber layup is placed in a mold and subsequently impregnated with resin, the specified shape of the rotor blade can be simultaneously produced and, on the other hand, the joining can be brought about. The joining can also be effected by the lightweight material being applied by means of a prepreg layup and after the application, consolidated and, in particular, pressed in a mold.

The ensuing description of a preferred embodiment serves in conjunction with the drawings to explain the invention in greater detail.

BRIEF DESCRIPTION OF THE DRAWINGS

FIG. 4 shows schematically a profile section with a median line drawn therein and an intersection curve between profile section and a joint surface; and FIGS. 5 (a) and (b) shows the course of two variants of a joint surface, each in sectional representation (course of intersection curve).

DETAILED DESCRIPTION OF THE INVENTION

Figure 1:
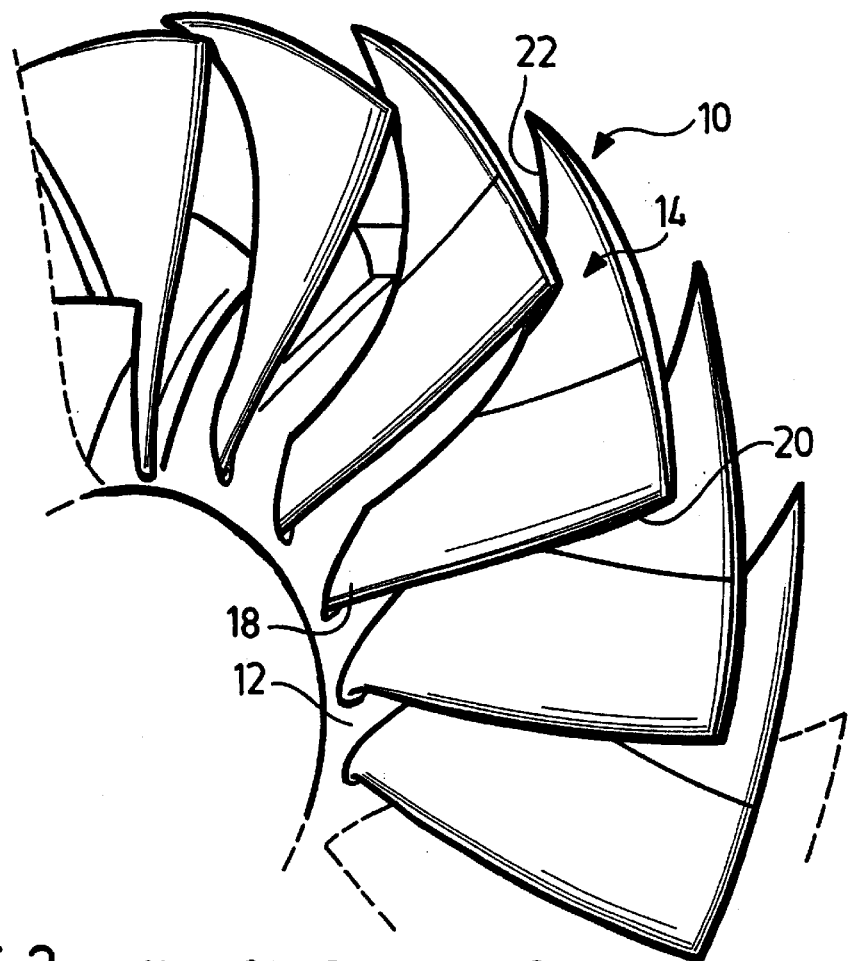
FIG. 1 shows a partial view of a rotor of an engine with rotor blades.

FIG. 1 shows a partial view of a rotor generally designated 10 comprising a holding ring 12 fixable on a shaft, or a holding disc. A plurality of rotor blades 14 are arranged on the holding ring 12 equidistantly around the circumference thereof.

Figure 2:
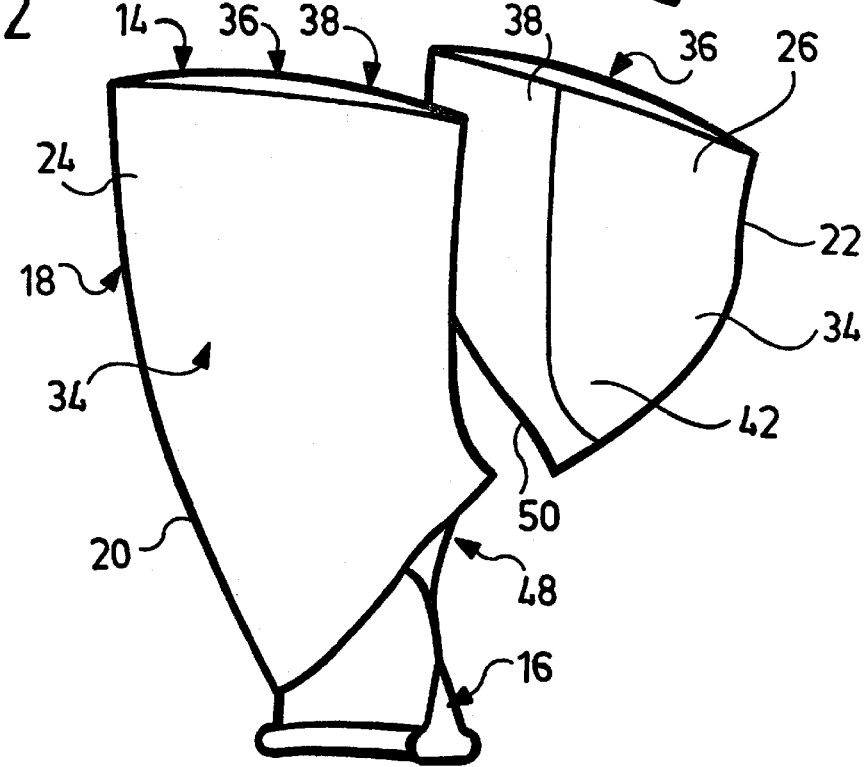
FIG. 2 shows in exploded representation an embodiment of a rotor blade according to the invention.

A rotor blade 14 comprises, as shown in FIG. 2, a blade root 16, with which the rotor blade 14 is fixable on the holding ring 12, and a vane generally designated 18. The vane 18 comprises a front edge 20 and a rear edge 22. A stagnation point of an air stream flowing around the vane 18 lies at the front edge 20.

A rotor blade 14, as shown in FIG. 2, is of two-part design with a first vane portion 24 and a second vane portion 26. The first vane portion 24 is made of a ductile, isotropic material, and, in particular, of a metallic material. In particular, the first vane portion 24 is made of titanium or a titanium compound. Titanium reinforced by fibers consisting, for example, of silicon carbide (titanium matrix composite) is also usable.

The second vane portion 26 is made of a lightweight material which has a lower density than the material of the first vane portion 24. It is, for example, conceivable for the second vane portion 26 to be made of aluminum. In particular, it is advantageous for the second vane portion 26 to be made of a fiber composite, for example, of a carbon fiber composite (CFK) which is very light. Such a material does, however, have a lower plasticity than a metal and is thus more susceptible to brittle fracture.

The blade root 16 is integrally formed on the first vane portion 24, and, in particular, is also made of the metallic material, such as titanium. It is subjected to a maximum load as it must withstand the centrifugal forces of the entire rotor blade 14.

The front edge 20 of the rotor blade 14 is formed on the first vane portion 24 and the rear edge 22 of the rotor blade 14 on the second vane portion 26. The front edge 20 is thus a "heavy" edge and the rear edge 22 a "light" edge.

Figures 3A, 3B, 3C, 3D, 3E, 3F, 3G:
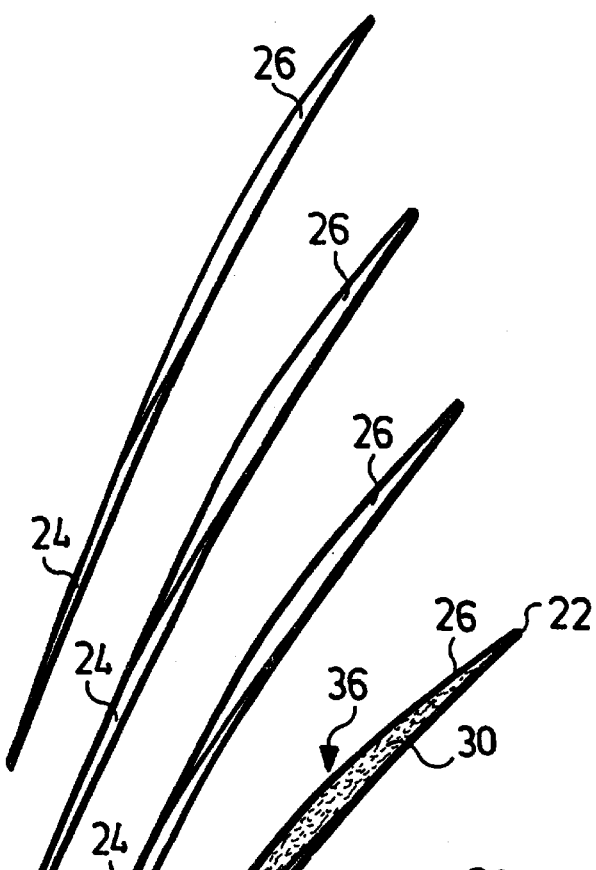
FIGS. 3 (a) to (g) shows profile sections of an assembled rotor blade according to FIG. 2, proceeding from an end (a) remote from a blade root into the area of the blade root (g)

The second vane portion 26 is arranged on the first vane portion 24 so that a first area 28 (front portion) which consists of the metallic material is formed on the vane 18, and a second area 30 (rear portion) which consists of the lightweight material is formed (FIG. 3 (d) ). In a transition area 32 a gradual transition occurs from a concave side 34 of the rotor blade 14 to a convex side 36. At least on average over the transition area 32, the width of the first vane portion 24 decreases from the front edge 20 to the rear edge 22, and, conversely, the width of the second vane portion 26 decreases from the rear edge 22 towards the front edge 20. A transition surface 38 (joint surface) is associated with the transition area 32 (see FIG. 2, in which the transition surface 38 is visible on the second vane portion 26 and is covered on the first vane portion 24).

The front portion 28 of the first vane portion 24 protrudes freely towards the front edge 20 and is exposed with respect to the second vane portion 26. The rear portion 30 of the second vane portion 26 protrudes freely in the direction of the rear edge 22 and is exposed with respect to the first vane portion 24.

The first vane portion 24 and the second vane portion 26 are joined to each other in a single-section-type manner. These vane portions 24 and 26 are joined together in a tapered manner with the width of one portion gradually increasing and the width of the other portion gradually decreasing. Material problems which arise from the hybrid design with a first vane portion 24 and a second vane portion 26 and correspondingly different materials are thereby reduced, because the graduation or tapering in the transition area 32 results in a homogeneous transition, and hydrostatic stresses, as occur with clamped joints (see FIG. 2 of DE 197 51 129 C1), are substantially avoided, and deviatoric stresses can be reduced by plastic flow.

Statistically, the rotor blade 14 according to the invention thus has a longer life and a higher degree of operational reliability.

The second vane portion 26 is arranged in the fashion of a tag on the first vane portion 24. The second vane portion 26 is of such dimensions that it forms an area of the rotor blade 14 which primarily has aerodynamic functions, i.e., in particular, only secondary structural functions. It does, however, have a vibration damping function as the macromolecules have a vibration damping effect owing to the high internal friction when a fiber composite is used as manufacturing material.

Owing to the fact that the front edge 20 of the rotor blade 14 is made of a metallic material, a good inherent resistance to erosion prevails there. Bird strikes constitute a real danger for rotor blades. These can cause lasting deformation, but operation of an engine with a rotor must still be possible within specified limits. A rotor blade has to be designed so that without loss of a vane, the energy upon bird impact can be irreversibly absorbed by plastic deformation. The blade root 16 and a concave side 40 of the first vane portion 24 bordering on the front edge 20 are, therefore, made of the metallic material.

On the other hand, vane mass can be saved with the second vane portion 26 made of the lightweight material, which corresponds to a decrease in vane energy at the operating point and also reduces an average load on the blade root. In addition, improved structural damping properties are achieved. For this reason, the vane 18 is divided up so that the lightweight material is used in areas which have essentially only aerodynamic functions. A concave side 42 of the second vane portion 26 bordering on the rear edge 22 is, therefore, made of the lightweight material. A convex side 44 of the first vane portion 24 and a convex side 46 of the second vane portion 26 then meet on account of their tapered-like joint and jointly form the convex side 36 of the rotor blade 14 (suction side). The concave side 34 is the pressure side.

The dimensions of the first vane portion 24 and the second vane portion 26 are determined, firstly, by the second vane portion 26 having to end at a sufficient distance above a blade root adjoining area 48, as an increased force load occurs in the blade root 16 and in the blade root adjoining area 48. Furthermore, the quasistatic bearing capacity with respect to loads must be guaranteed, these loads being, in particular, centrifugal loads and aerodynamic buoyancy forces. The vibrational behavior, in particular, with respect to resonances, must also be optimized so as to avoid too strong loads on the material. Optimization with respect to the danger of bird strikes has already been mentioned above.

With a rotor blade 14, in which the first vane portion 24 and the second vane portion 26 have the shape shown in FIG. 2, the first vane portion 24 being made of titanium and the second vane portion 26 of a fiber composite, a saving of mass of approximately 16% was achieved, and, in turn, the vane energy at the operating point was thereby reduced by 22% and the average load on the blade root was also reduced by approximately 19%.

The transition at the tapered-like or single-section-type transition surface 38 is linear in first approximation with respect to a profile cross section of the rotor blade 14 (see FIG. 3), the transition surface 38 representing a smooth surface (continuously differentiable manifold on an macroscopic scale).

Formation of a double-section-type transition must not occur as this can be accompanied by a high load on the material owing to hydrostatic stresses which have been caused by such a multiple-section transition.

That an average curvature radius of the joint surface 38 is considerably larger than a lateral extent of the joint surface 38 between the concave side 34 and the convex side 36 can, for example, be regarded as criterion for the formation of a tapered-like joint surface 38 (single-section-type transition surface 38). Here considerably larger means at least five times and, in particular, at least ten times larger. (In the case of a flat surface the curvature radius is infinite.) That the angular deviation of normal vectors of the transition surface 38 with respect to an average normal vector is at the most 20° and, in particular, less than 10° and, advantageously, less than 5°, can be applied as alternative or additional criterion. A gradual material transition over the joint surface 38 is thereby achieved.

A particularly suitable quantitative criterion with respect to the presence of a single-section-type or tapered-like joint is, as shown in FIG. 4, when a curve 102 which is the intersection curve of a joint surface with a profile section 104 through the rotor blade 14, is in one-to-one correspondence (bijective relation) with a median line 106 of the profile section 104. This relation, which is shown by way of example in FIG. 4 with a selected profile section 104, must apply over the entire joint surface 38, i.e., to all profile sections which contain an intersection curve 102 with the joint surface 38.

The median line 106 is defined as that curve which is formed by the central points 108 of the circles 110, the circles being inscribed in the profile 112 in accordance with the profile section 104 and touching the profile 112 at two points 114, 116.

The bijectivity of the relation between the intersection curve 102 and the median line 106 means that for each single point 118 on the intersection curve 102 there is uniquely associated therewith a single point 120 on the median line 106, and, conversely, for each point on the median line 106, at least in a certain arc length portion, defined by an initial point 122 and an end point 124 of the intersection curve 102, there is uniquely associated therewith a single point on the intersection curve 102.

Such a relation can be described by a stringently monotonic functional dependency between each point of the intersection curve 102 and the median line 106 and vice-versa.

To this end, for example, starting from the intersection curve 102 a functional value is formed by the normal 126 being erected in the direction of the median line 106, and the functional value being determined by the distance between the intersection curve 102 and the median line 106 and, for example, normalized to a width of the profile 112, the width being determined perpendicularly to the median line 106 on the intersection curve 102 or the median line 106.

An alternative possibility for determining the function, which is preferred in practice, would be to erect a normal from the median line 106 to the intersection curve 102 and then apply the distance from a point of intersection normalized there to the width as functional value. Here the normalization is carried out in a coordinate system which is particularly well-suited because it is profile-related.

The construed quantitative functional connection between intersection curve 102 and median line 106 must be stringently monotonic.

Preferably, the gradual transition from the second vane portion 26 into the first vane portion 24 in the transition area 32 is only linear in first approximation; in a variant of an embodiment, as shown in FIG. 5(a), the first vane portion 24 first decreases underproportionally, i.e., the first vane portion 24 is first thicker than would correspond to a linear decrease, and, a bulge 150 is then formed, in particular, in the direction of a concave side 34 of the second vane portion 26, so that the metallic material here tapers off thinner in the direction of the concave side 34 than would correspond to a linear transition 152. Thus, there is first an underproportional and then a superproportional decrease in the metallic material such as, for example, titanium. An area 154 of the underproportional decrease in the metallic material lies closer to the front edge 20, an area 156 of the superproportional decrease lies closer to the rear edge 22. As, for example, titanium has a low shear deformability (has a high shear rigidity), a higher material comparability of the vane 18 at an end 158 of the transition area 38 is obtained by a bulge 152 of the lightweight material into the titanium and the thinner tapering-off of the titanium which is thereby achieved.

Owing to the thinner tapering-off of the lightweight material in the area 144 at the other end 160 of the transition area, the angle at which the first vane portion 24 and the second vane portion 26 strike each other is reduced by the corresponding geometric design of the transition area 38. In turn, stress peaks which may occur in the transition area 38 can be reduced thereby, and the susceptibility of the rotor blade 14 to start tearing can be diminished.

In the embodiment shown in FIG. 5 (*a*), on account of the formation of the oppositely oriented bulges of the areas 154 and 156, an intersection curve 162 has between the transition surface 38 and a profile section a turning point 164 which may lie, for example, at or in the proximity of the linear transition 152.

In another variant of an embodiment shown in FIG. 5 (*b*), the lightweight material forms with respect to a linear transition 166 a bulge 168 into the metallic material of the first vane portion 24. This results in a thinner tapering-off of the metallic material in the direction of the rear edge 22. With respect to the shear deformability, the material compatability between the lightweight material of the second vane portion and the metallic material of the first vane portion at an end area 170 of the transition surface 38 facing the rear edge 22 is thereby achievable.

It is further provided that outside an adjoining area 50 of the second vane portion 26 on the blade root 16, i.e., in particular, in an upper area of the second vane portion 26, the first vane portion laterally occupies approximately 20% to 45% and, in particular, approximately ⅓ of the convex side 36 of the vane 18. It is also advantageous for the first vane portion 24 to laterally occupy approximately 50% to 75%, and, in particular, approximately ⅔ of the concave side 34 of the vane 18. Outside the adjoining area 50, the transition area 32 then laterally occupies an area of approximately 25% to 40% and, in particular, approximately ⅓ of the vane 18.

The second vane portion 26 is adhesively joined to the first vane portion 24. A separate layer of adhesive may be provided. But, in particular, the adhesion is formed by means of the fiber composite for the second vane portion 26 during the manufacture, without a separate adhesive having to be provided.

The joint may be additionally reinforced by the second vane portion 26 and the first vane portion 24 being additionally fixed to each other by sewing or riveting (not shown in the drawings).

An inventive rotor blade 14 is manufactured as follows:

The first vane portion 24 is made entirely from the metallic material. The transition surface formed thereon for joining with the second vane portion 26 is roughened, in particular, by mechanical machining, such as sandblasting or by ultrasonic machining, in order to increase the capability of this surface area to become joined to a fiber composite. The surface in this area is then cleaned, for example, ultrasonically, and, in particular, made grease-free by means of solvents. In a mold, which serves to form the entire shape of the vane 18, a fiber composite is then placed on the transition surface 38 and pressed to the first vane portion 24. The first vane portion 24 itself is then to some extent a part of the mold.

It can also be provided that a fiber layup is laid out in the mold and then cast with synthetic resin, such as an epoxy resin. The latter is used especially when the matrix of the fiber composite is formed by a thermosetting material.

A prepreg material comprising a preimpregnated material with fibers embedded in a matrix may also be used. The matrix may, for example, be a thermosetting material or a thermoplastic material.

An adhesive-matrix unit which bonds the fiber layup to the metal surface of the first vane portion 24 is formed in the transition area 32 by the inventive process for manufacturing a rotor blade.

What is claimed is:

1. Rotor blade of hybrid design comprising:
   a vane and a blade root,
   said vane having a first vane portion made of a metallic material and a second vane portion made of a lightweight material, wherein:
     a rear edge of said rotor blade is formed on said second vane portion, and said second vane portion is joined to said first vane portion in a single-section-type manner,
     said second vane portion and said first vane portion are joined together in a joint surface formed at an area of said first vane portion and at an area of said second vane portion; and
     a curve formed by the section of said joint surface with a profile section is in one-to-one correspondence with the median line of said profile section.

2. Rotor blade in accordance with claim 1, wherein said second vane portion is joined to said first vane portion in a tapered manner with a gradual increase in the width of one portion and a corresponding gradual decrease in the width of the other portion.

3. Rotor blade in accordance with claim 1, wherein a front edge of said rotor blade is formed on said first vane portion.

4. Rotor blade in accordance with claim 1, wherein said first vane portion protrudes in a front portion thereof beyond said second vane portion.

5. Rotor blade in accordance with claim 4, wherein a front edge of said rotor blade is formed in said front portion.

6. Rotor blade in accordance with claim 1, wherein said second vane portion protrudes in a rear portion thereof beyond said first vane portion.

7. Rotor blade in accordance with claim 6, wherein the rear edge of said rotor blade is formed in said rear portion.

8. Rotor blade in accordance with claim 1, wherein said second vane portion is arranged on said first vane portion.

9. Rotor blade in accordance with claim 1, wherein said first vane portion forms a concave side of said rotor blade at a front edge of said rotor blade.

10. Rotor blade in accordance with claim 1, wherein said first vane portion forms a convex side of said rotor blade at a front edge of said rotor blade.

11. Rotor blade in accordance with claim 1, wherein said second vane portion forms a concave side of said rotor blade at a rear edge of said rotor blade.

12. Rotor blade in accordance with claim 1, wherein said second vane portion forms a convex side of said rotor blade at a rear edge of said rotor blade.

13. Rotor blade in accordance with claim 1, wherein said second vane portion forms an area of said rotor blade which has primarily aerodynamic functions.

14. Rotor blade in accordance with claim 1, wherein said joint surface is designed such that a curvature radius is substantially larger than the lateral extent of said joint surface.

15. Rotor blade in accordance with claim 1, wherein the deviation of normal vectors of said joint surface from an average normal vector of said joint surface is at the most 20°.

16. Rotor blade in accordance with claim 1, wherein said blade root is joined to said first vane portion.

17. Rotor blade in accordance with claim 1, wherein said blade root is integrally formed on said first vane portion.

18. Rotor blade in accordance with claim 1, wherein said second vane portion is arranged outside an adjoining area of said blade root.

19. Rotor blade in accordance with claim 1, wherein said rotor blade has:

a first area between a convex side and a concave side of said rotor blade, said first area being made of the metallic material;

a second area between said convex side and said concave side of said rotor blade, said second area being made of the lightweight material; and a transition area between said convex side and said concave side of said rotor blade, said transition area partially including the metallic material and partially including the lightweight material.

20. Rotor blade in accordance with claim 19, wherein a gradual transition of the material occurs in said transition area with respect to the distance between convex side and concave side of said rotor blade.

21. Rotor blade in accordance with claim 19, wherein the transition in said transition area is approximately linear in a cross-sectional area of said rotor blade.

22. Rotor blade in accordance with claim 21, wherein the transition in said transition area deviates from the linearity in that said second vane portion is enlarged towards said concave side of said rotor blade.

23. Rotor blade in accordance with claim 21, wherein the transition in said transition area deviates from the linearity in that said first vane portion is enlarged towards said convex side of said rotor blade.

24. Rotor blade in accordance with claim 1, wherein said first vane portion laterally occupies approximately 20% to 45% of a convex side of said rotor blade at least in an area remote from said blade root.

25. Rotor blade in accordance with claim 1, wherein said first vane portion laterally occupies 50% to 75% of a concave side of said rotor blade at least in an area remote from said blade root.

26. Rotor blade in accordance with claim 1, wherein the material for said first vane portion is titanium or a titanium compound.

27. Rotor blade in accordance with claim 1, wherein the material for said second vane portion is a fiber composite.

28. Rotor blade in accordance with claim 27, wherein the material for said second vane portion is a carbon fiber composite.

29. Rotor blade in accordance with claim 1, wherein said second vane portion is adhesively joined to said first vane portion.

30. Rotor blade in accordance with claim 1, wherein said second vane portion is formed by a fiber layup or prepreg material which is placed on said first vane portion and then further processed.

31. Rotor blade in accordance with claim 1, wherein said first vane portion has a roughened surface in an overlapping area for joining thereof to said second vane portion.

32. Rotor blade in accordance with claim 1, wherein the joint between said first vane portion and said second vane portion is reinforced by sewing or riveting.

33. Process for the manufacture of a rotor blade in accordance with claim 1, wherein said first vane portion is manufactured, a surface area of said first vane portion is machined in preparation for the application of a lightweight material for formation of said second vane portion, and the lightweight material is then applied and a second vane portion formed.

34. Process in accordance with claim 33, wherein the surface area is cleaned.

35. Process in accordance with claim 33, wherein the surface area is roughened.

36. Process in accordance with claim 35, wherein the surface area is sandblasted.

37. Process in accordance with claim 35, wherein the surface area is cleaned and/or machined ultrasonically.

38. Process in accordance with claim 33, wherein a layup is applied to the surface area and then further processed.

39. Process in accordance with claim 38, wherein a fiber layup is placed in a mold and then impregnated with resin.

40. Process in accordance with claim 38, wherein the lightweight material is applied by means of a prepreg layup.

41. Process in accordance with claim 40, wherein the prepreg layup is consolidated after application.

* * * * *